Sept. 18, 1934.  G. FUCHS ET AL  1,973,979
METHOD OF IGNITION AND MIXTURE COMPRESSING INTERNAL COMBUSTION ENGINE
Filed March 30, 1931

Patented Sept. 18, 1934

1,973,979

UNITED STATES PATENT OFFICE 1,973,979

METHOD OF IGNITION AND MIXTURE COMPRESSING INTERNAL COMBUSTION ENGINE

Gottfried Fuchs and Hermann Späth, Stuttgart-Cannstadt, Germany

Application March 30, 1931, Serial No. 526,425
In Germany July 9, 1929

3 Claims. (Cl. 123—143)

Methods of ignition and mixture compressing internal combustion engines are known, in which a compressed mixture is used. Further a method for strengthening the mixture and ignition for mixture compressing internal combustion engines are known, in which the working cylinder operates with a not easily ignitable oil-air mixture, to which an easily ignitable mixture of hydrogen and air or, in another experiment, of hydrogen and oxygen is added. According to a further experiment an over compression has to be produced by adding oxygen and hydrogen or acetylene to the fuel mixture.

Further an experiment is known, in which hydrocarbon vapour and air are added to the mixture. With all these mixtures the ignition is effected in known manner by a flame or by sparking plugs.

The ignition method in mixture compressing internal combustion engines according to the invention differs from these experiments in that a highly heated mixture of hydrogen and oxygen is added to the compressed fuel-air mixture for initiating the ignition.

For carrying out this method a special piston pump is provided on the mixture compressing internal combustion engine, which pump sucks in hydrogen and oxygen and forces this mixture into the combustion space directly after the working piston has reached its extreme dead centre position. The pump serving for introducing the hydrogen-oxygen mixture is arranged on the cylinder head and has a mechanically controlled admission-valve and an also mechanically constructed exhaust valve.

Owing to the high temperature occurring at the explosion the further splitting up of the hydrogen and oxygen vapours takes place at the same time, whereby the explosion force is increased many times, a saving in the fuel hitherto necessary being effected by the explosion force. As compared with the known experiments the present method presents the advantage, that the fuel is utilized to a maximum extent.

Figure 1:
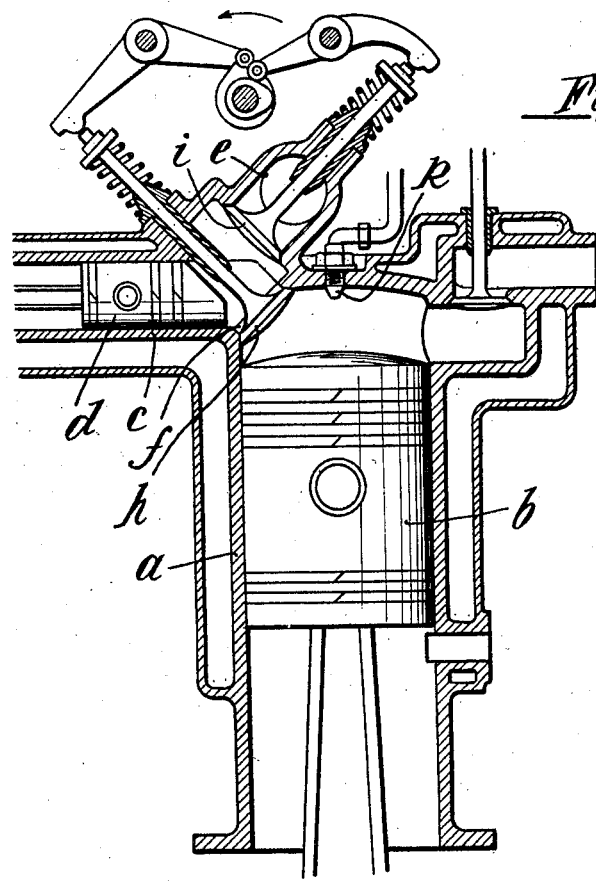
Figure 2:
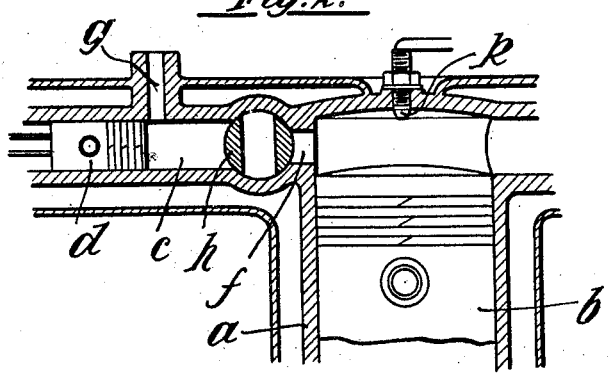

Two forms of construction of a mixture compressing internal combustion engine for carrying out the method according to the invention are illustrated in vertical sections in Figs. 1 and 2 of the accompanying drawing.

The internal combustion engine consists in known manner of a cylinder $a$ with a working piston $b$. A further smaller cylinder $c$ communicates with the cylinder $a$ and is provided with a piston $d$. The cylinder $c$ has an induction port $e$ and a communicating port $f$ to the cylinder $a$. The induction port $e$ communicates through a pipe with the apparatus for producing the hydrogen and oxygen gases. The port $e$ and the port $f$ can be shut by closing elements $h, i$, which are so controlled that, after the explosion in the cylinder $a$, the port $e$ is opened for filling the cylinder $c$. After the filling of the cylinder $c$ the valve $i$ is again closed. The closing element $h$ is opened at the instant the maximum compression of the fuel is reached and again closed.

During the up stroke of the main piston $b$ the normal working mixture is compressed, after which a highly heated but unignited mixture of a hydrogen and oxygen is introduced. The hydrogen and oxygen are obtained under high temperature from steam and supplied to the normal working mixture in such a highly heated condition that the mixture is ignited, the highly heated hydrogen and oxygen vapours being much hotter than the normal ignition temperature of the working mixtures.

According to the construction illustrated in Fig. 2, an induction port $g$ is directly controlled by the reciprocating movements of the piston $d$. During the forward stroke of the piston it closes the port $g$ so that a separate closing element is done away with. The fuel is injected finely atomized through a nozzle $k$ into the cylinder $a$ so that an instantaneous evaporation takes place. This fuel is compressed almost to self ignition by the piston $b$. At the instant of maximum compression the element $h$ opens and the hydrogen and oxygen gas vapours are forced by the piston $d$ into the cylinder $a$, whereby the ignition is effected. After the ignition the closing element $h$ is again closed, whereupon the piston $d$ by its backward stroke again fills the cylinder $c$ with hydrogen and oxygen vapours for the next ignition.

According to the invention therefore the ignition in the engine cylinder is effected without the aid of sparking plugs in that the charge is compressed in the usual manner by means of a piston and when this piston reaches its extreme dead centre position, in which the charge is under maximum compression but not ignited, a mixture of hydrogen and oxygen having a temperature of 2000° to 2500° C., that is below the temperature necessary for self combustion, is injected into the compressed charge. The temperature of the mixture is sufficient to ignite the compressed charge and the combustion of the charge raises the temperature of the mixture to about 3000° C. at which temperature the hydrogen and oxygen likewise enter into spontaneous combustion.

We claim:

1. A mixture compressing internal combustion engine for the self ignition method as specified in claim 2, comprising in combination with the usual working cylinder and working piston, a small auxiliary cylinder communicating with said working cylinder and having an induction port for the admission of the ignition charge composed of highly heated oxygen and hydrogen, an auxiliary piston in said auxiliary cylinder adapted to draw the highly heated oxygen and hydrogen from said port and force same into said working cylinder, means for closing said port after the filling of said auxiliary cylinder, and means for momentarily opening and closing said auxiliary cylinder towards said working cylinder the instant said working piston has passed its upper dead centre position.

2. A method of ignition for internal combustion engines, consisting in compressing the charge, and injecting a mixture of hydrogen and oxygen at a temperature of 600 to 2500° C. into the charge to explode the same, the mixture of hydrogen and oxygen entering also into combustion owing to their being heated to a still higher temperature by the combustion of the charge.

3. Ignition arrangement for internal combustion engines for carrying out the method specified in claim 2, comprising in combination with the engine cylinder, a piston reciprocatable in said cylinder to compress the charge, an auxiliary cylinder communicating with said engine cylinder, an auxiliary piston reciprocatable in said auxiliary cylinder adapted to force a mixture of hydrogen and oxygen into said engine cylinder, a valve between said two cylinders, and means for opening said valve when said engine piston is in its extreme upper dead centre position exciting maximum compression of the charge to admit said hydrogen and oxygen mixture into said engine cylinder and effect ignition of the charge by the heat of said mixture.

GOTTFRIED FUCHS.
HERMANN SPÄTH.